United States Patent
Huang et al.

(10) Patent No.: US 9,121,978 B2
(45) Date of Patent: Sep. 1, 2015

(54) FRONT LIGHT MODULE AND DISPLAY DEVICE USING THE SAME

(75) Inventors: Hsin-Tao Huang, Hsinchu (TW); Chuang-Chuang Tsai, Hsinchu (TW)

(73) Assignee: E INK HOLDINGS INC., Hsinchu (TW)

(*) Notice: Subject to any disclaimer, the term of this patent is extended or adjusted under 35 U.S.C. 154(b) by 185 days.

(21) Appl. No.: 13/334,416

(22) Filed: Dec. 22, 2011

(65) Prior Publication Data

US 2012/0257409 A1    Oct. 11, 2012

(30) Foreign Application Priority Data

Apr. 8, 2011    (TW) ............................... 100112158 A

(51) Int. Cl.
*F21V 7/04*    (2006.01)
*F21V 8/00*    (2006.01)

(52) U.S. Cl.
CPC ............ *G02B 6/0035* (2013.01); *G02B 6/0036* (2013.01); *G02B 6/0061* (2013.01)

(58) Field of Classification Search
CPC ... G02B 6/0035; G02B 6/0036; G02B 6/0061
USPC ............ 362/603, 615, 611, 620, 633; 349/63, 349/65

See application file for complete search history.

(56) References Cited

U.S. PATENT DOCUMENTS

| | | | |
|---|---|---|---|
| 6,816,214 B1* | 11/2004 | Ohsumi | 349/65 |
| 7,001,060 B1* | 2/2006 | Kimura | 362/620 |
| 7,671,935 B2* | 3/2010 | Mather et al. | 349/65 |
| 7,997,783 B2* | 8/2011 | Song et al. | 362/620 |
| 8,152,352 B2* | 4/2012 | Richardson | 362/615 |
| 2006/0077690 A1* | 4/2006 | Inditsky | 362/615 |
| 2008/0043171 A1* | 2/2008 | Takahashi et al. | 349/65 |
| 2010/0208169 A1* | 8/2010 | Mun et al. | 349/65 |
| 2010/0296025 A1* | 11/2010 | Gourlay | 349/62 |

* cited by examiner

*Primary Examiner* — Anh Mai
*Assistant Examiner* — Jessica M Apenteng
(74) *Attorney, Agent, or Firm* — Guice Patents PLLC

(57) ABSTRACT

A front light module, including: a light source; a light guide plate, having a first refractive index and having a side face close to the light source; and a plurality of pillar structures, having a second refractive index and being placed under the light guide plate, and the second refractive index is larger than or equal to the first refractive index.

18 Claims, 7 Drawing Sheets

FRONT LIGHT MODULE AND DISPLAY DEVICE USING THE SAME

BACKGROUND OF THE INVENTION

1. Field of the Invention

The present invention relates to a front light module, especially to a front light module capable of improving the efficiency in guiding light downward.

2. Description of the Related Art

Front light modules for transflective or reflective displays are commonly of edge-lighting type or direct-lighting type, wherein the front light modules of edge-lighting type are becoming dominant due to the market's growing demand on small form factor of displays.

A typical front light module of edge-lighting type generally installs a downward-light-guiding means on the top face of a light guide plate, to transform an edge light to a uniform plane light, which emits light beams downward to provide illumination for a display. Please refer to FIG. 1, which illustrates a cross sectional view of a front light module for providing a plane light to illuminate a reflective type LCD 140 according to a prior art. As illustrated in FIG. 1, the front light module includes a light source 100, a reflective cover 110, a diffusion plate 120, and a light guide plate 130.

In the module, the light source 100, reflective cover 110, and diffusion plate 120 are used for providing diffused incident light.

The light guide plate 130, of which the left side face is a light entrance surface close to the diffusion plate 120, the bottom face is a light exit surface, and the top face has a plurality of diffusion points 131, wherein, the diffused incident light hitting the diffusion points 131 indirectly (after going through a total reflection at the bottom face of the light guide plate 130) or directly will be scattered off, and some of the scattered light—of which the traveling direction forms with a normal line of the light exit surface an angle smaller than a total reflection angle—will pass through the light exit surface to illuminate the reflective type LCD 140.

Although the diffusion points 131 have the advantage of easy implementation (can use sand-blasting process), however, the efficiency in guiding light downward is not good enough—some of the light scattered by the diffusion points 131 will emit away from the top face of the light guide plate 130, causing energy loss.

To improve the efficiency in guiding light downward, there is another prior art design using microstructure as a means for guiding light downward. Please refer to FIG. 2, which illustrates a cross sectional view of a front light module for providing a plane light to illuminate a reflective type LCD 240 according to another prior art. As illustrated in FIG. 2, the front light module includes a light source 200, a reflective cover 210, a diffusion plate 220, and a light guide plate 230.

In the module, the light source 200, reflective cover 210, and diffusion plate 220 are used for providing diffused incident light.

The light guide plate 230, of which the left side face is a light entrance surface close to the diffusion plate 220, the bottom face is a light exit surface, and the top face has a plurality of V type microstructures 231, wherein, the diffused incident light hitting the V type microstructures 231 indirectly (after going through a total reflection at the bottom face of the light guide plate 230) or directly will be reflected to travel down along a normal line of the light exit surface to pass through the light exit surface to illuminate the reflective type LCD 240.

Although the V type microstructures 231 can provide better efficiency in guiding light downward, nevertheless, they have the disadvantage of being not easy to implement.

What is more, as the diffusion points 131 of the front light module of FIG. 1 and the V type microstructures 231 of the front light module of FIG. 2 are located at the top face of the light guide plate, therefore they both have the problems of interfering with a user's viewing the display and being subject to getting scratched.

In view of the foregoing problems, the present invention proposes a front light module having a novel structure for guiding light downward.

SUMMARY OF THE INVENTION

One objective of the present invention is to disclose a front light module, which has a novel structure for guiding light downward more efficiently.

Another objective of the present invention is to disclose a front light module having a novel structure for guiding light downward, which is easy to implement.

Still another objective of the present invention is to disclose a front light module having a novel structure for guiding light downward, which can avoid interfering with a user's viewing the display.

Still another objective of the present invention is to disclose a front light module having a novel structure for guiding light downward, which can avoid getting scratched.

To attain the foregoing objectives, an embodiment of the present invention provides a front light module, and the front light module including a light source, a light guide plate, and a plurality of pillar structures.

In the module, the light source is capable of emitting an incident light.

The light guide plate has a side face and a bottom surface connected to the side face, and the light guide plate has a first refractive index, the side face neighbors the light source and receives the incident light.

The plurality of pillar structures are placed under the bottom surface of the light guide plate, and the pillar structures have a second refractive index and the second refractive index is larger than or equal to the first refractive index.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
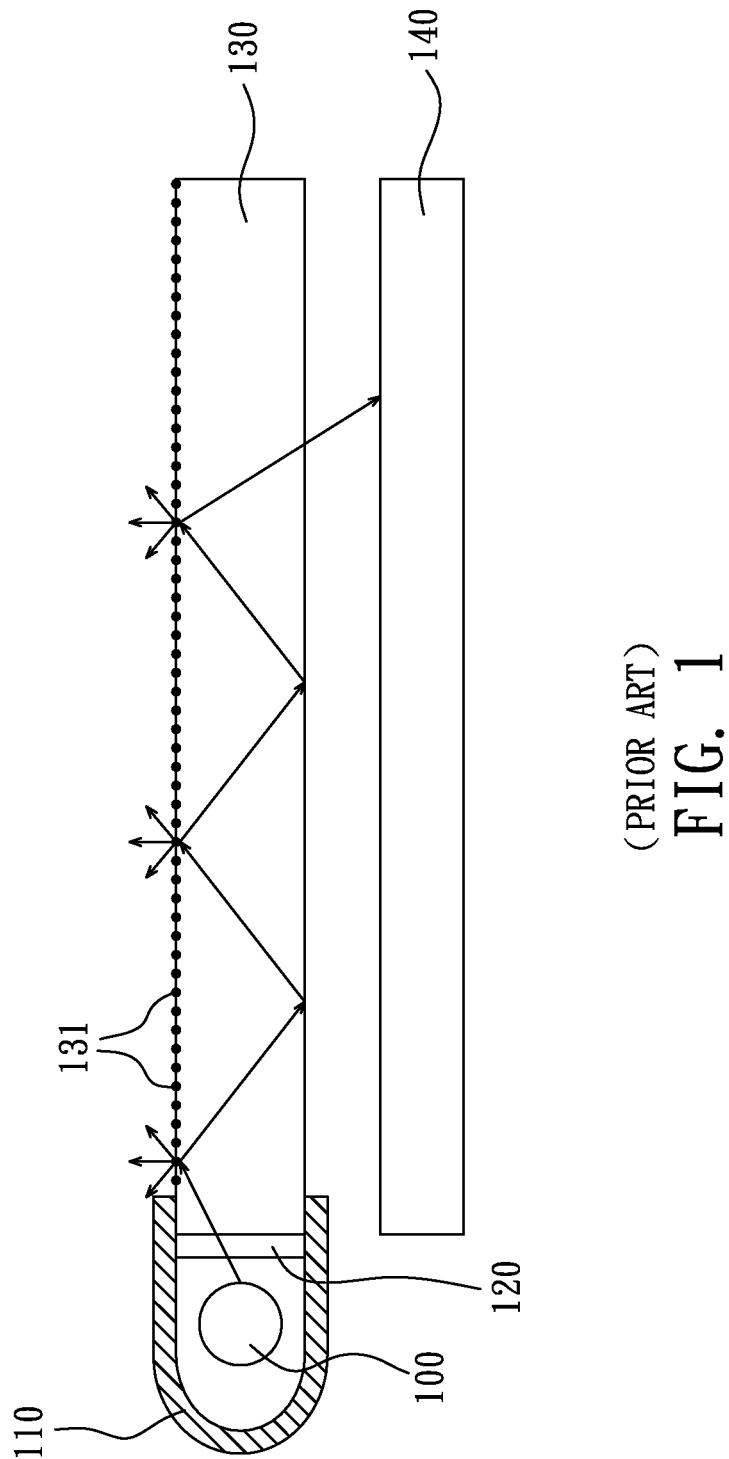
FIG. 1 illustrates a cross sectional view of a front light module for providing a plane light to illuminate a reflective type LCD according to a prior art.
Figure 2:
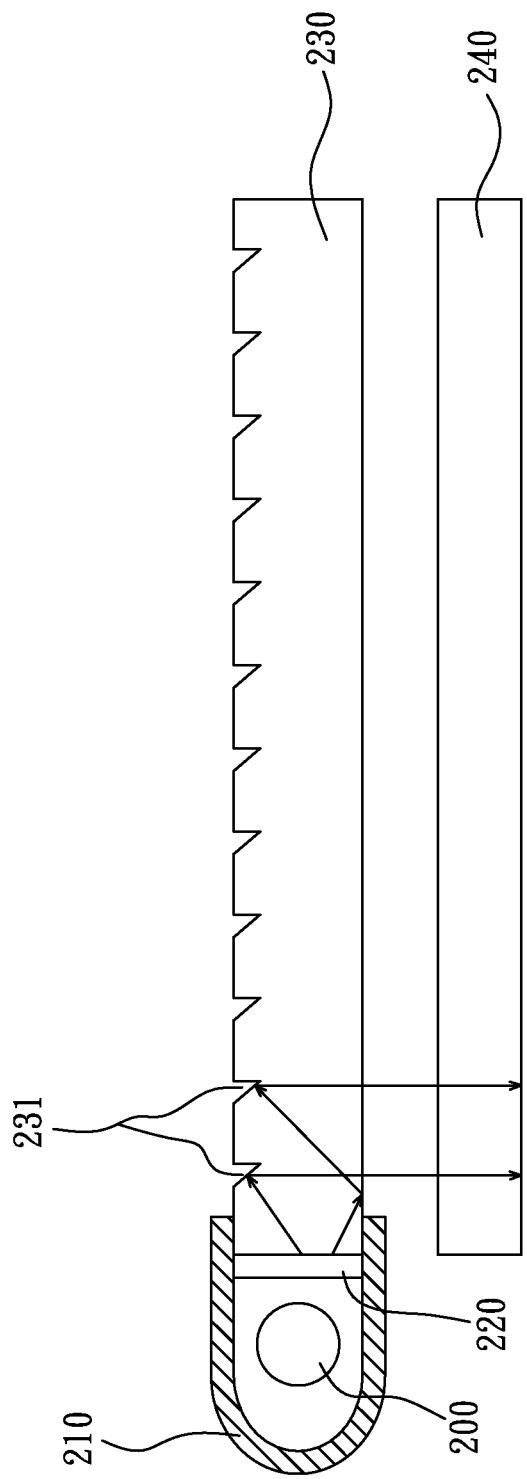
FIG. 2 illustrates a cross sectional view of a front light module for providing a plane light to illuminate a reflective type LCD according to another prior art.
Figure 3A:
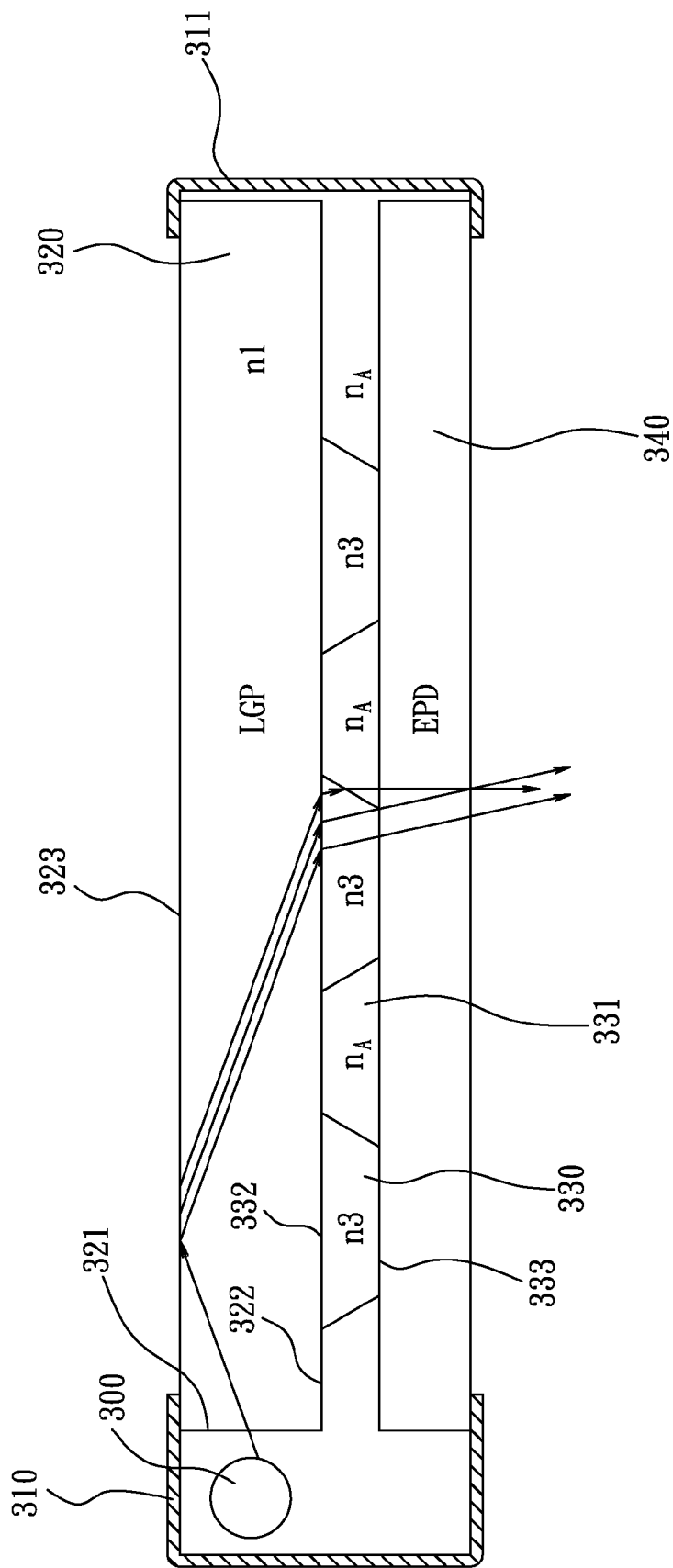
FIG. 3a illustrates a cross sectional view of a front light module according to a preferred embodiment of the present invention.

Please refer to FIG. 3a, which illustrates a cross sectional view of a front light module according to a preferred embodiment of the present invention. As illustrated in FIG. 3a, the front light module includes a light source 300, a reflective cover 310, a fixing frame 311, a light guide plate 320, a plurality of pillar structures 330, and an electronic paper device 340.

In the module, the light source 300 is used with the reflective cover 310 to provide an incident light for the light guide plate 320. The light source 300 can include a fluorescent lamp or a light emitting diode.

The reflective cover 310 and the fixing frame 311 are used for bonding the light guide plate 320, the pillar structures 330, and the electronic paper device 340 together to form a display device, and both a first width of a first opening of the reflective cover 310 and a second width of a second opening of the fixing frame 311 are preferably smaller than a total thickness of a stack of the light guide plate 320, the pillar structures 330, and the electronic paper device 340, so that the reflective cover 310 and the fixing frame 311 can produce a clamping force when they are expanded to hold the stack. The clamping force can expel the air in the interface of the pillar structures 330 and the light guide plate 320, and the air in the interface of the pillar structures 330 and the electronic paper device 340, so as to offer excellent display quality.

The light guide plate 320 has a side face 321 and a bottom surface 322 connected to the side face 321, wherein the light guide plate 320 has a first refractive index n1 and the side face 321 neighbors the light source 300 and receives the incident light. The first refractive index n1 is larger than $n_A$ (=1), so as to set a total reflection critical angle of $\sin^{-1}(1/n1)$ to avoid the incident light emitting from the top face 323 of the light guide plate 320.

Figure 3B:
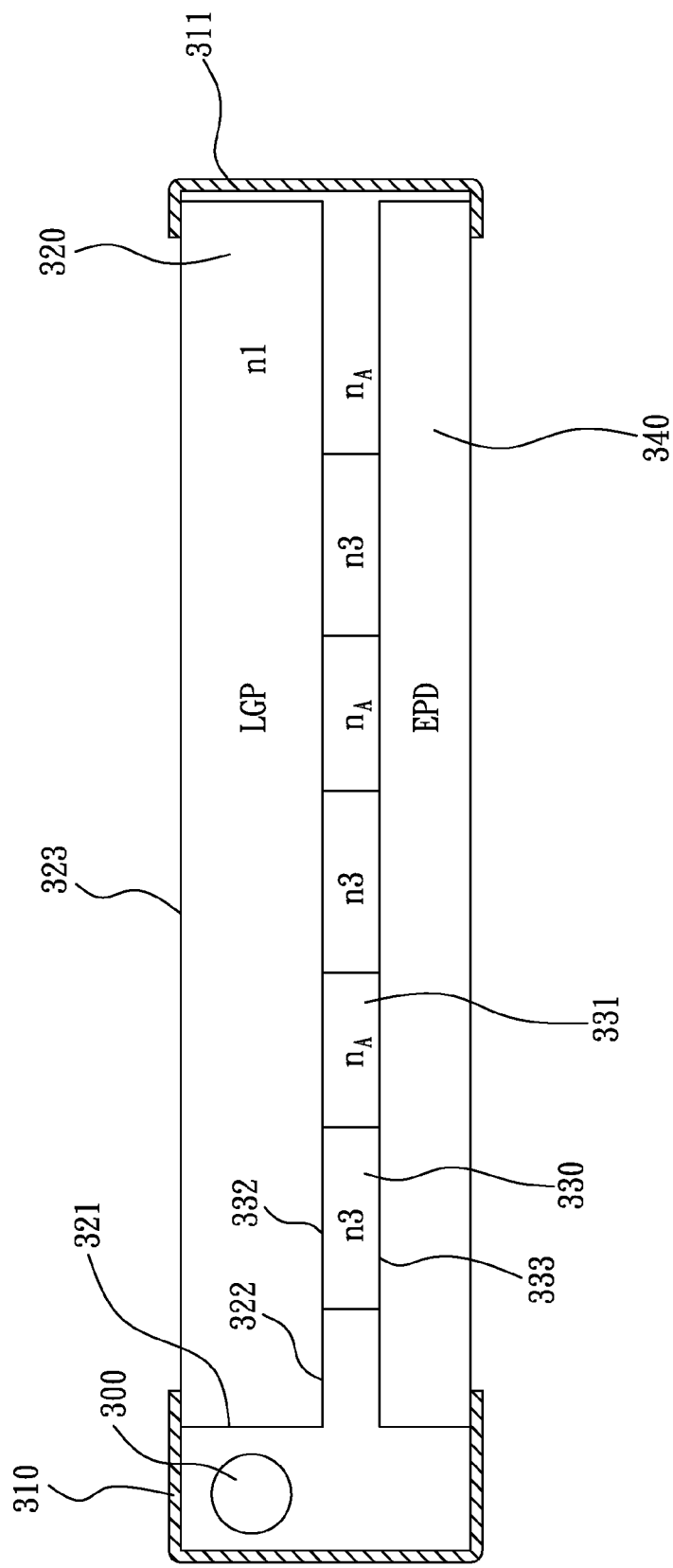
FIG. 3b illustrates a cross sectional view of a front light module according to another preferred embodiment of the present invention.
Figure 3C:
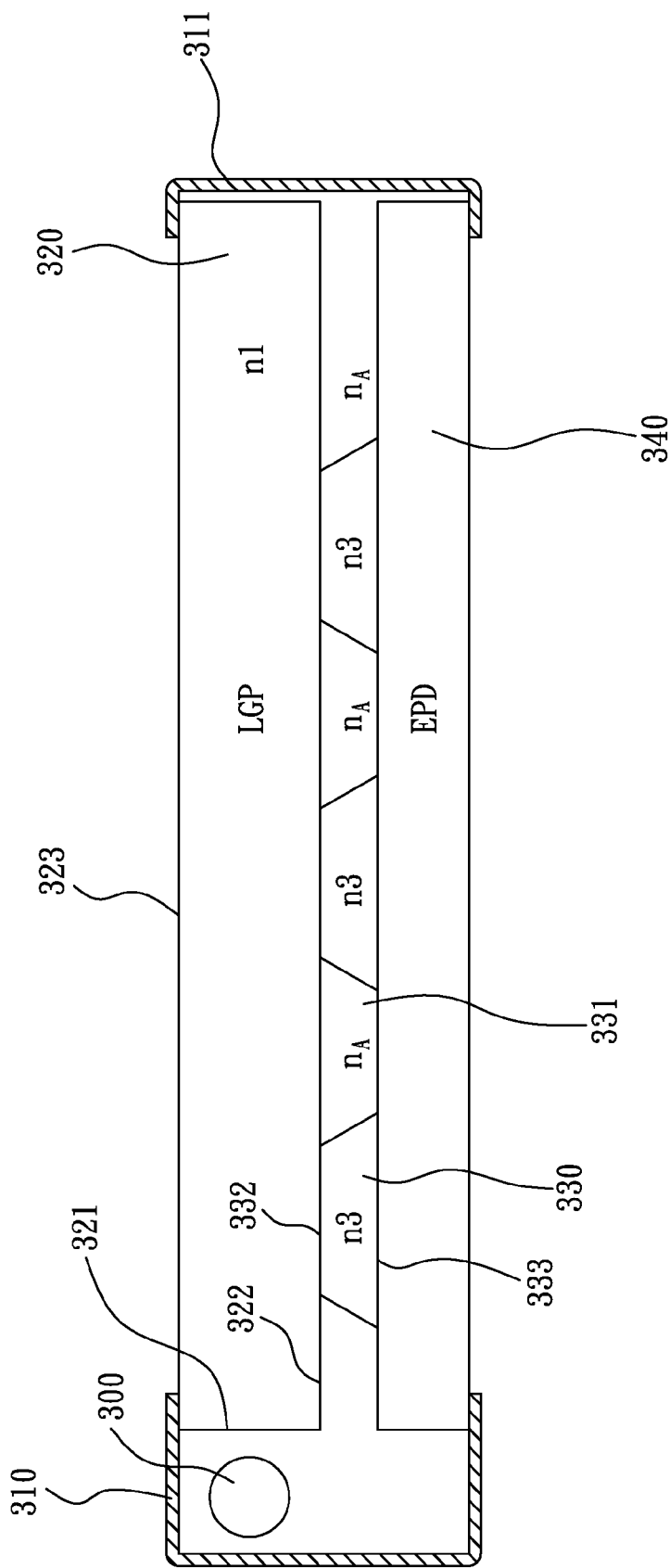
FIG. 3c illustrates a cross sectional view of a front light module according to still another preferred embodiment of the present invention.

The pillar structures 330 are placed under the bottom surface 322 of the light guide plate 320, and made of a transparent material having a second refractive index n3, and can be attached to the bottom surface 322 of the light guide plate 320 by using a screen printing process. The second refractive index n3 is larger than or equal to the first refractive index n1, so that the light travelling in the light guide plate 320 can be diverted downward when incident on the pillar structures 330. In addition, there are a plurality of gaps 331—having the refractive index $n_A$ (=1)—among the pillar structures 330 for causing the incident light totally reflected to travel right-upward. With the arrangement of the pillar structures 330 and the gaps 331, not only the light intensity on right side of the light guide plate 320 can be enhanced, but also the efficiency in guiding light downward of the light guide plate 320 can be improved, thereby providing a uniform plane light for the electronic paper device 340. Although each of the pillar structures 330 illustrated in this embodiment has a top face 332 and a bottom face 333 opposite to the top face 332, and the area of the top face 332 is larger than that of the bottom face 333, actually other shapes can also be used. For example, each of the pillar structures 330 illustrated in FIG. 3b has the area of the top face 332 equal to that of the bottom face 333, while each of the pillar structures 330 illustrated in FIG. 3c has the area of the top face 332 smaller than that of the bottom face 333.

Figure 4:
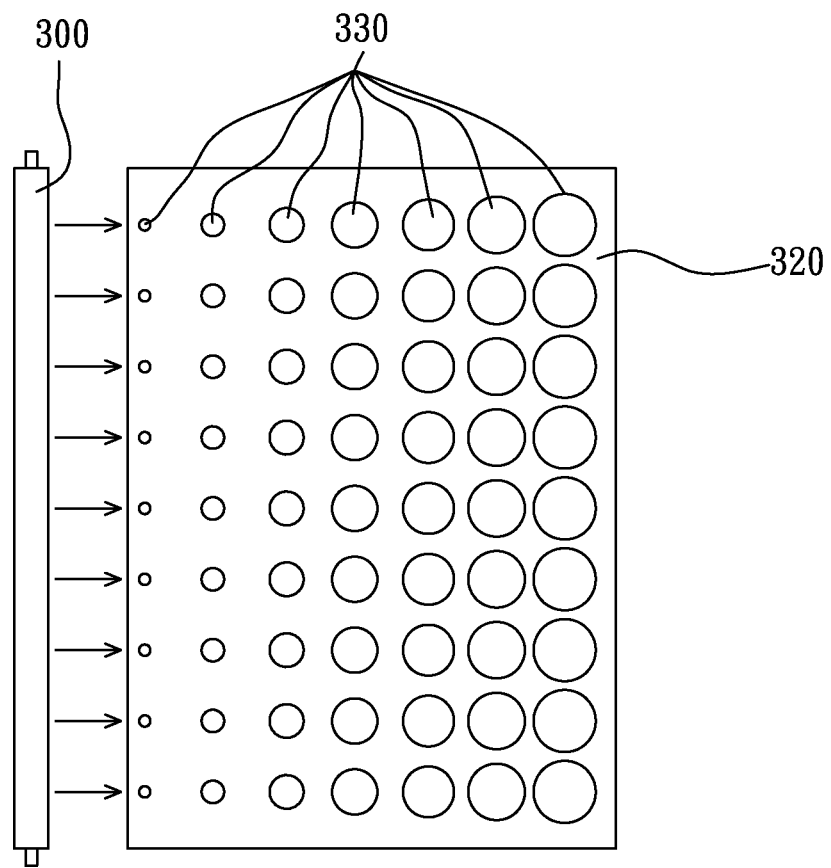
FIG. 4 illustrates a bottom view of a front light module according to still another preferred embodiment of the present invention.
Figure 5:
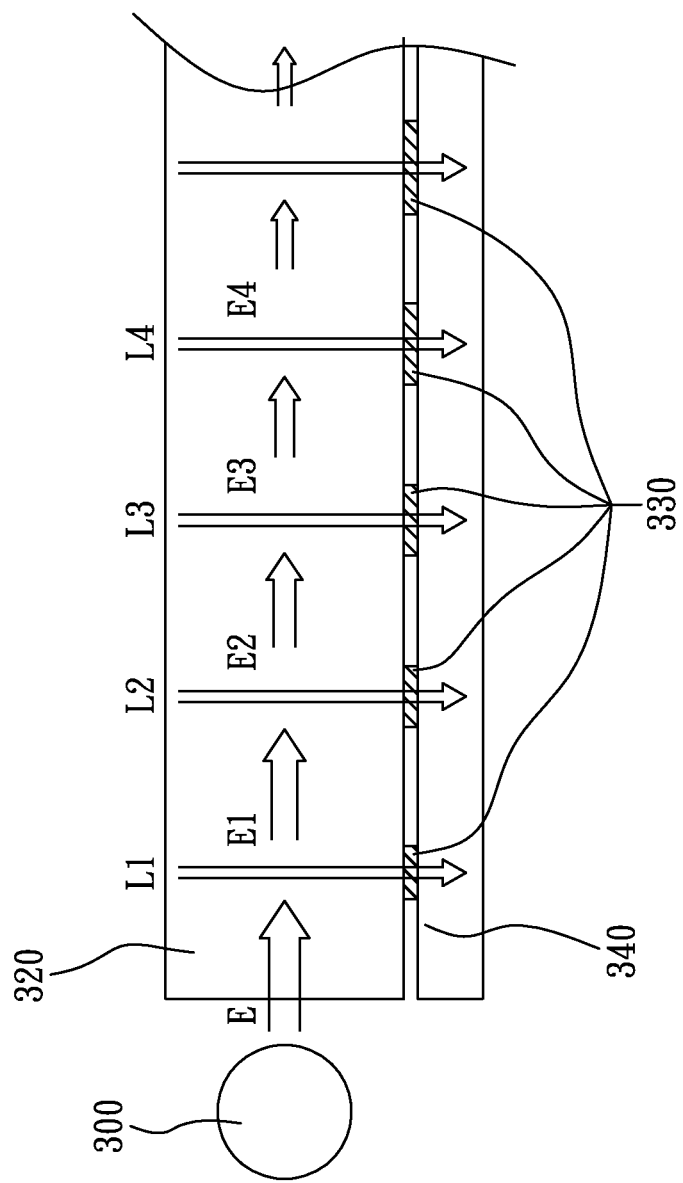
FIG. 5 illustrates the process of the incident light diverted downward by the front light module of FIG. 4.

Besides, by arranging the distribution of the pillar structures 330 in a certain way can further improve the uniformity of the plane light. Please refer to FIG. 4, which illustrates a bottom view of a front light module according to still another preferred embodiment of the present invention. As illustrated in FIG. 4, each pillar structure 330 is located a first distance from the light source 300, and the area of the top face of each pillar structure 330 varies with the first distance—the farer the first distance, the larger the area of the top face. Besides, a gap is formed between two neighboring ones of the pillar structures 300 and located a second distance from the light source 300, and the gap varies with the second distance—the gap becomes smaller as the second distance increases. With this arrangement, the ratio of the downward guided light to the totally reflected light at the bottom face 322 of the light guide plate 320 will vary with the distance between the pillar structure 330 and the light source 300—the farer the distance, the larger the ratio, so as to adjust the intensity distribution of the downward guided light over the bottom face 322 of the light guide plate 320 to provide a uniform plane light. The process of the incident light guided downward by the front light module of FIG. 4 is illustrated in FIG. 5. As can be seen in FIG. 5 that E>E1>E2>E3>E4, i.e., an incident light E has a decaying effect during the travelling process; and the distribution of the pillar structures 330—with the area of the top face 332 of the pillar structure 330 increasing gradually—compensates the decaying effect and results in uniform light beams (L1、L2、L3、L4) going downward, making L1≈L2≈L3≈L4.

In addition, the bottom faces 332 of the pillar structures 330 can be adhered to the electronic paper device 340 by a glue material, and the electronic paper device 340 can be a reflective type or transflective type display device, for example but not limited to electrophoresis display, MEMS (micro electro mechanical system) display, cholesteric liquid crystal display, electrowetting display, liquid crystal display, organic/inorganic electroluminescence display, or electrochromic display.

In conclusion, the front light module of the present invention can improve the efficiency in guiding light downward by the novel pillar structures, which can be implemented on the bottom face of a light guide plate by common manufacture processes, so as to avoid interfering with a user's viewing the display, and avoid getting scratched. Therefore, the present invention possesses superior advantages.

While the invention has been described by way of example and in terms of a preferred embodiments, it is to be understood that the invention is not limited thereto. To the contrary, it is intended to cover various modifications and similar arrangements and procedures—for example, the reflective cover 310 and the fixing frame 311 can also be implemented by a reflective tape, which can serve both the function of reflecting light beams and the function of bonding the light guide plate 320 and the electronic paper device 340 together, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A front light module, comprising:
   a light source, being capable of emitting an incident light;
   a light guide plate, having a side face and a bottom surface connected to said side face, wherein said light guide plate has a first refractive index and said side face neighbors said light source and is capable of receiving said incident light; and
   a plurality of pillar structures, being placed under said bottom surface of said light guide plate, wherein said pillar structures have a second refractive index and said second refractive index of said plurality of pillar structures is larger than said first refractive index of said light guide plate;
   wherein a light traveling in said light guide plate is diverted downwardly toward a display device when incident on said pillar structures;
   wherein a fixing frame is used with a reflective cover to bond said light guide plate, said pillar structures, and said display device together, both a first width of a first opening of said reflective cover and a second width of a second opening of said fixing frame are smaller than a total thickness of said light guide plate, said pillar structures, and said display device, and opposing side faces of said light guide plate, said pillar structures, and said display device are secured in said first opening of said reflective cover and said second opening of said fixing frame respectively.

2. The front light module as claimed in claim 1, wherein said light source comprises a device selected from a group consisting of a fluorescent lamp and a light emitting diode.

3. The front light module as claimed in claim 1, wherein each said pillar structure has a top face and a bottom face opposite to the top face, and the area of said top face is larger than that of said bottom face.

4. The front light module as claimed in claim 1, wherein each said pillar structure has a top face and a bottom face opposite to the top face, and the area of said top face is equal to that of said bottom face.

5. The front light module as claimed in claim 1, wherein each said pillar structure has a top face and a bottom face opposite to the top face, and the area of said top face is smaller than that of said bottom face.

6. The front light module as claimed in claim 1, wherein each said pillar structure of the plurality of pillar structures is located a first distance from said light source, and an area of a top face of each said pillar structure increases as said first distance located between said light source and each said pillar structure increases.

7. The front light module as claimed in claim 6, wherein a gap is formed between two adjacent pillar structures of said plurality of pillar structures that are located a second distance from said light source, and said gap varies with said second distance, and said gap located between said two adjacent pillar structures of said plurality of pillar structures becomes smaller when said second distance located between said light source and said two adjacent pillar structures of said plurality of pillar structures increases.

8. The front light module as claimed in claim 1, wherein said display device is an electronic paper device and is placed below said pillar structures.

9. The front light module as claimed in claim 8, wherein said electronic paper device is adhered to said pillar structures by a glue material.

10. The front light module as claimed in claim 9, wherein said reflective cover is used with said light source to generate said incident light.

11. The front light module as claimed in claim 10, wherein said reflective cover directly engaging a top surface of said light guide plate and a bottom surface of said electronic paper device and said fixing frame directly engaging a top surface of said light guide plate and a bottom surface of said electronic paper device thereby securing said pillar structures between said light guide plate and said electronic paper device.

12. The front light module as claimed in claim 10, wherein both said reflective cover and said fixing frame are implemented with a reflective tape.

13. The front light module as claimed in claim 8, wherein said electronic paper device is a device selected from a group consisting of a reflective type display device and a transflective type display device.

14. The front light module as claimed in claim 8, wherein said electronic paper device is one selected from the group consisting of electrophoresis display, MEMS (micro electro mechanical system) display, cholesteric liquid crystal display, electrowetting display, liquid crystal display, organic/inorganic electroluminescence display, and electrochromic display.

15. The front light module as claimed in claim 1, wherein said plurality of pillar structures are arranged in a plurality of rows, each row of said plurality of rows has a plurality of pillar structures.

16. A display device, comprising:
    a light source, being capable of emitting an incident light;
    a light guide plate, having a side face and a bottom surface connected to said side face, wherein said light guide plate has a first refractive index and said side face neighbors said light source and is capable of receiving said incident light;
    a plurality of pillar structures, being placed under said bottom surface of said light guide plate, wherein said pillar structures have a second refractive index and said second refractive index of said plurality of pillar structures is larger than said first refractive index of said light guide plate;
    a display panel, placed below said pillar structures; and
    a fixing frame, used to bond said light guide plate, said pillar structures, and said display panel together, wherein a width of an opening of said fixing frame is smaller than a total thickness of said light guide plate, said pillar structures, and said display panel;
    wherein a light traveling in said light guide plate is diverted downwardly toward a display device when incident on said pillar structures.

17. The display device as claimed in claim 16, wherein said plurality of pillar structures are arranged in a plurality of rows, each row of said plurality of rows has a plurality of pillar structures.

18. The display device as claimed in claim 16, wherein said fixing frame directly engaging a top surface of said light guide plate and a bottom surface of said display panel thereby securing said pillar structures between said light guide plate and said display panel.

* * * * *